United States Patent [19]
Kunz

[11] 3,934,689
[45] Jan. 27, 1976

[54] SYNCHRONIZATION MECHANISM FOR CHANGE-SPEED TRANSMISSIONS OF MOTOR VEHICLES

[75] Inventor: Emil Kunz, Kornwestheim, Germany

[73] Assignee: Dr. Ing h.c.F. Porsche Aktiengesellschaft, Germany

[22] Filed: Apr. 8, 1974

[21] Appl. No.: 459,122

[30] Foreign Application Priority Data
Apr. 10, 1973 Germany............................ 2317852

[52] U.S. Cl.............. 192/53 C; 192/53 A; 192/108
[51] Int. Cl.²........................................ F16D 11/00
[58] Field of Search ....... 192/53 C, 53 A, 53 F, 108

[56] References Cited
UNITED STATES PATENTS

| | | | |
|---|---|---|---|
| 2,932,373 | 4/1960 | Schmid | 192/53 A |
| 3,224,534 | 12/1965 | Boguslawski et al. | 192/53 C |
| 3,504,775 | 4/1970 | Reich et al. | 192/53 C |
| 3,633,716 | 1/1972 | Gortz | 192/53 C |
| 3,744,604 | 7/1973 | Austen | 192/53 C |

Primary Examiner—Samuel Scott
Assistant Examiner—Randall Heald
Attorney, Agent, or Firm—Craig & Antonelli

[57] ABSTRACT

A synchronization mechanism, especially for change-speed transmissions of motor vehicles, in which a slotted synchronizing ring is under the influence of slotted ring-shaped blocking means increasing the servo-effect thereof which is arranged between the synchronizing ring and the hub of its associated coupling member; the blocking means is supported during the synchronizing operation at an abutment extending into a recess in the hub of a coupling member whereby the abutment is anchored together with the blocking means intermediate the ring ends thereof.

28 Claims, 12 Drawing Figures

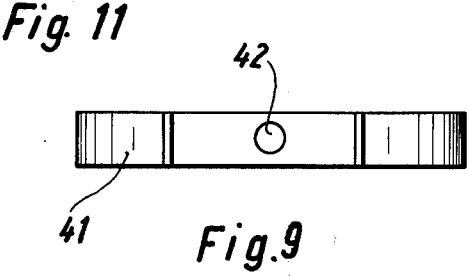
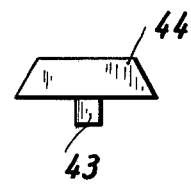
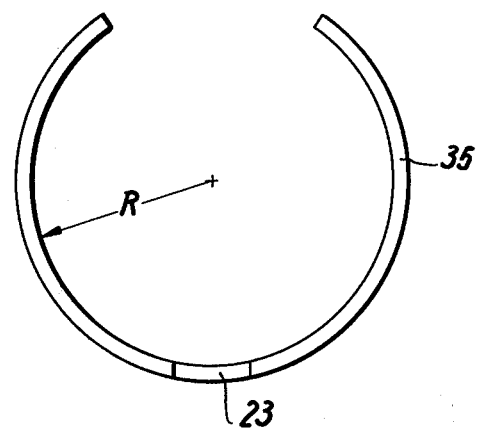
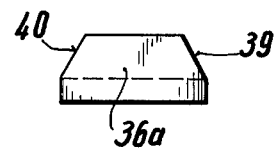

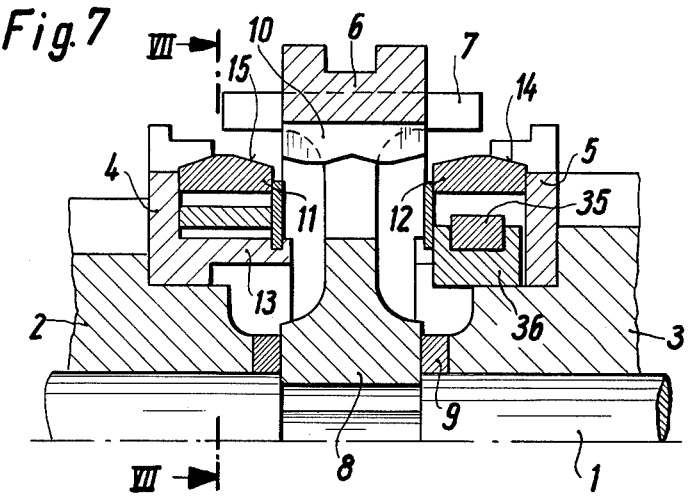
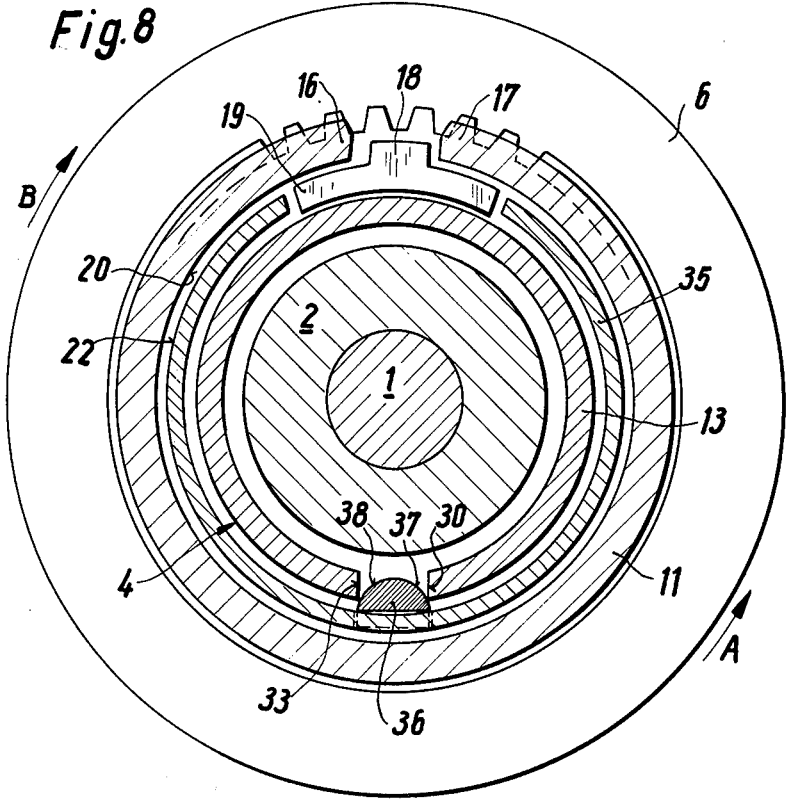

SYNCHRONIZATION MECHANISM FOR CHANGE-SPEED TRANSMISSIONS OF MOTOR VEHICLES

The present invention relates to a synchronization mechanism, especially for change-speed transmissions of motor vehicles, in which a slotted synchronizing ring is under the influence of slotted, ring-shaped blocking means increasing the servo-effect thereof, which is arranged between the synchronizing ring and the hub of its associated coupling member.

Synchronizing mechanisms of the aforementioned type are known in the art (German Offenlegungsschrift 1,919,294), in which the blocking means is formed by a slotted band receiving the displaceable abutment between its ring-ends, which band is supported with a cam-like shaped body disposed opposite the ring ends in a recess of the coupling member of the gear wheel to be shifted or engaged. The counter-surfaces of the recess which cooperate with the shaped body may thereby receive a different configuration corresponding to the desired blocking and return force. In connection with this prior art blocking means construction, however, the frequent breakage of the blocking means within the area of the cam-like shaped body has proved as particularly disadvantageous. Therebeyond, the manufacture of such a blocking means was possible only with considerable manufacturing expenditures.

Furthermore, synchronization mechanisms, especially for the lowest speed of a change-speed transmission are known (French Pat. No. 1,586,353) in which slotted and springy synchronizing rings are under the influence of means increasing the servo-effect, which are arranged between the synchronizing ring and the hub of the coupling member of the gear to be shifted and are acted upon by a double-armed slide member which, equipped with a nose, extends between the slot of the synchronizing ring, one arm of the slide member cooperating with a blocking band and the other arm of the slide member being supported at the nose of the coupling member by interposition of a springy means, whereby the springy means are formed by a compression spring which is inserted into the enlarged end of the arm of the slide member and is retained in the tangential direction in a recess of the hub of the coupling member. In addition to the high manufacturing costs of this prior art slide member, it has proved in connection therewith as particularly disadvantageous that the compression spring becomes effective on the slide member in the tangential direction in such a manner that the slide member is forced outwardly which has as a consequence a frequent jamming of the slide member. The considerable assembly expenditures which become necessary during the exchange of the compression spring is also disadvantageous in such an arrangement.

The aim of the present invention, in contradistinction thereto, essentially consists in providing a synchronization installation for the lowest speed of a change-speed transmission, which during the engagement of the first speed with a standing-still vehicle under relinquishment of an additional springy or elastic means, produces during the synchronizing operation such a large elastic return force as assists to a sufficient extent the disengagement of the blocking means, and in which during the shifting down into the first speed, like the synchronization mechanisms of the remaining speeds, the blocking means so increase the servo effect of the synchronizing ring that an easy and fast engagement of the speeds becomes possible.

The underlying problems are solved according to the present invention in that the blocking means is supported during a synchronization operation at an abutment extending into a recess or aperture provided in the hub of the coupling member which abutment is anchored together with the blocking means intermediate the ring ends of the blocking means. It has thereby proved as particularly advantageous in connection with synchronization installations for the lowest speed that the abutment is supported in the circumferential direction A with a perpendicular surface at a perpendicular side surface of the recess and in the circumferential direction B with a deflection surface at a perpendicular side surface of the recess. The deflection surface may thereby be formed by a curved surface or by a flat, straight surface extending at an inclination to the perpendicular side surface of the recess. The blocking means has within the area C a concentrically extending radius R and within the areas D a radius $R_1$ extending eccentrically to the area C. A further embodiment according to the present invention of the blocking means resides in that the blocking means has within the area E a concentrically extending radius R and within the area F a radius $R_2$ extending eccentrically to the area E.

It has proved as particularly advantageous in synchronization mechanisms for the remaining speeds that the abutment is supported in the circumferential direction A and B by means of a deflection surface at a perpendicular surface of the aperture or recess. The deflection surface is formed either by a curved surface or by a flat, straight surface extending at an inclination to the perpendicular side surface of the recess. It is advantageous if the blocking means has a concentrically extending radius R.

The anchoring of the abutment in the blocking means may be realized advantageously in all speed stages in such a manner that the blocking means is provided within the area of the abutment at the end surfaces with opposite radial grooves, the abutment is provided on the side opposite the recess with a groove extending in the circumferential direction and the webs of the abutment delimiting the groove engage into the grooves of the blocking means, or in such a manner that the abutment includes a pin at the side opposite the recess which engages into an aperture of any desired shape arranged between the end surfaces of the blocking means.

The advantages achieved by the present invention reside in particular in that an easy and fast engagement is possible with the blocking means according to the present invention in cooperation with the abutment projecting into the recess provided at the coupling member during a shifting down into the first speed and during the engagement of the remaining speeds, and in that during the engagement of the first speed with a standing-still vehicle, a hung-up speed is avoided with certainty without exposing the blocking means to loads within the area of the abutment which effect a breaking of the blocking means. By reason of the simple construction, the synchronization mechanism according to the present invention offers, particularly at the lowest speed, a high operating reliability and ease of assembly as compared to other known mechanisms of the prior art.

These and other objects, features and advantages of the present invention will become more apparent from the following description when taken in connection with the accompanying drawing which shows, for purposes of illustration only, several embodiments in accordance with the present invention, and wherein:

FIG. 6 is an elevational view of one embodiment of an abutment in accordance with the present invention;

FIG. 7 is a partial longitudinal cross-sectional view through a synchronization mechanism according to the present invention for the further speeds of a shifting-sleeve transmission of a motor vehicle;

FIG. 8 is a cross-sectional view taken along line VII—VII of FIG. 7;

FIG. 9 is a side view of another embodiment of a blocking means in accordance with the present invention;

FIG. 10 is an elevational view of a further embodiment of an abutment in accordance with the present invention;

FIG. 11 is a plan view of still another embodiment of a blocking means in accordance with the present invention; and FIG. 12 is an elevational view of still another embodiment of an abutment in accordance with the present invention.

Figure 1:
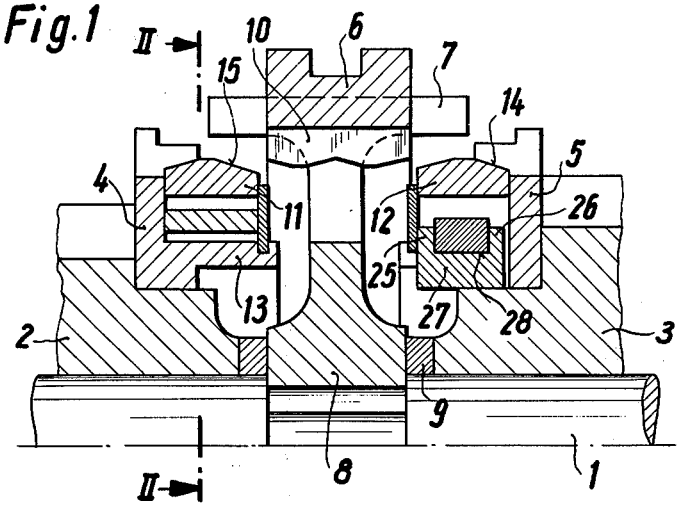
FIG. 1 is a partial longitudinal cross-sectional view through a synchronization mechanism in accordance with the present invention for the first speed of a shifting-sleeve transmission of a motor vehicle.
Figure 2:
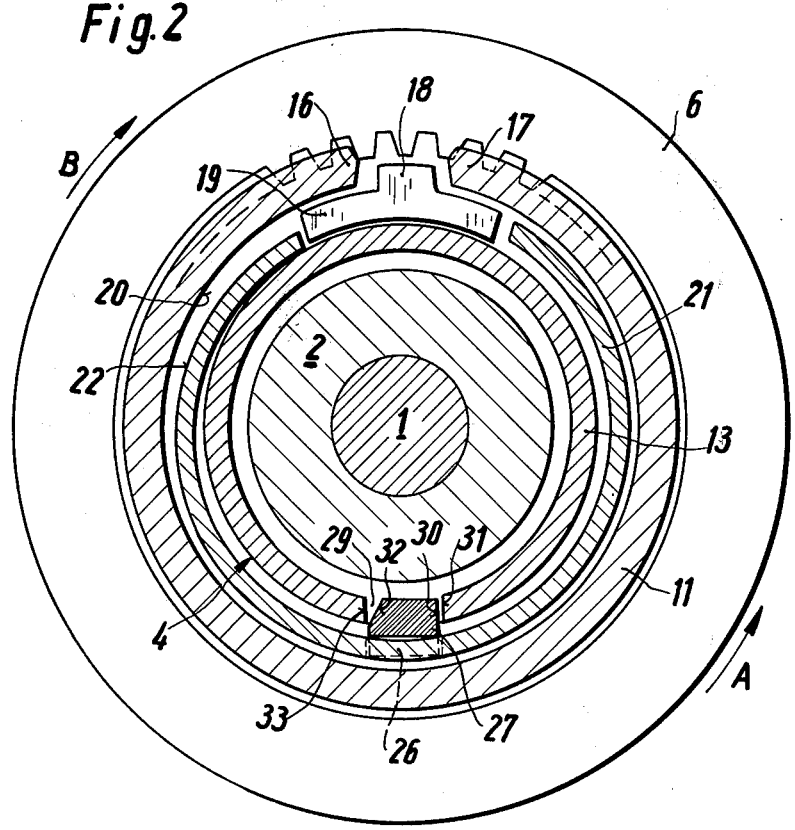
FIG. 2 is a cross-sectional view taken along line II—II of FIG. 1.

Referring now to the drawing wherein like reference numerals are used throughout the various views to designate like parts, and more particularly to FIGS. 1 and 2, in the transmission section illustrated in these two figures, gears 2 and 3 are freely rotatably but longitudinally non-displaceably supported on a transmission shaft indicated by reference numeral 1. The gears 2 and 3 are in constant meshing engagement with gears (not shown) disposed on a further transmission shaft (not shown) and are rigidly connected together with coupling bodies or members 4 and 5. The coupling members 4 and 5 are adapted to be coupled with a shifting sleeve 6 which is axially displaceably retained on webs 7 of a shifting sleeve carrier 8. The shifting sleeve carrier 8 is non-rotatably connected with the transmission shaft 1 for rotation in unison therewith and is axially fixed between abutment disks 9. The head surfaces of the teeth 10 of the shifting sleeve 6 cooperate with synchronizing rings 11 and 12 which are arranged under prestress on the hub 13 of the coupling members 4 and 5 of the gears 2 and 3 to be shifted. Each of the synchronizing rings 11 and 12 is provided with a centering surface 14 and with a friction surface 15. The nose portion 18 of a slide member 19 projects between the ends 16 and 17 of the synchronizing ring 11; the slide member 19, in turn, is retained displaceable in the circumferential direction on the hub 13 of the coupling member 4. A blocking means 21 in the form of a band is arranged between the hub 13 and the inner surface 20 of the synchronizing ring 11; surface 22 of the blocking means 21 cooperates with the synchronizing ring 11. The blocking means 21 is provided in its curvature bottom with mutually opposite radial grooves 23 and 24 (FIGS. 3 and 4) at its end surfaces, into which engage the webs 25 and 26 (FIGS. 1 and 2) of a loose abutment 27 and whereby the abutment 27 is anchored together with the blocking means 21. The webs 25 and 26 delimit a groove 28 (FIG. 1) extending in the circumferential direction within the abutment 27 which with the side opposite the groove 28 is supported in a recess 29 (FIG. 2) of the coupling member 4 or 5. During a synchronizing operation, the abutment 27 is supported with its perpendicular surface 30 at the perpendicular surface 31 of the recess 29 or with the inclined surface 32 at the perpendicular surface 33 of the recess 29.

During the engagement of the first speed from standstill of the vehicle, the shifting sleeve 6 is moved axially with respect to the sleeve carrier 8 toward the left as viewed in FIG. 1 with a running engine and the head surfaces of the shifting teeth 10 are brought into frictional engagement with the friction surface 15 of the synchronizing ring 11, whereby the synchronizing ring 11 is taken along in the direction of rotation A (FIG. 2). The abutment of the end 17 of the synchronizing ring 11 thereby forces the slide member 19 in the same direction so that the blocking means 21 actuates the abutment 27 which is then supported with the perpendicular surface 31 at the perpendicular surface 30 of the recess 29 whereby the left portion (FIG. 2) of the blocking means 21 is stressed. During this operation, a relative movement takes place between the inner surface 20 of the synchronizing ring 11 and the surface 22 of the blocking means 21 together with a friction work resulting therefrom which becomes effective at the synchronizing ring 11 in the form of a radial expansion force. If synchronism is attained as a result of the friction work between the friction surface 15 and the shifting sleeve 6, on the one hand, and between the blocking member 21 and the inner surface of the synchronizing ring 11, on the other, then the synchronizing mechanism is unstressed. The shifting sleeve 6 can then be forced over the synchronizing ring 11 and can be brought into engagement with the coupling member 4 whereby the shifting operation is completed. When shifting down from the second to the first speed, the shifting sleeve 6 is moved with respect to the sleeve carrier 8 axially toward the right as viewed in FIG. 1 and the head surfaces of the shifting teeth 10 are brought into frictional contact with the friction surface 15 of the synchronizing ring 12 whereby the synchronizing ring 12 is taken along in the direction of rotation B (FIG. 2). The abutting end 16 of the synchronizing ring 12 thereby forces the slide member 19 in the same direction so that the blocking means 21 actuates the abutment 27 which is then supported with the inclined surface 32 at the perpendicular surface 33 of the recess 29 whereby the right portion of the blocking means 21 is forced more strongly against the inner surface 20 of the synchronizing ring 11 than is the case with the left portion of the blocking means 21 so that the friction force between the blocking means 21 and the inner surface 20 of the synchronizing ring 11 is larger than during the engagement of the first speed from standstill of the vehicle. The engagement of the speed now takes place in the same manner as already described.

Figure 3:
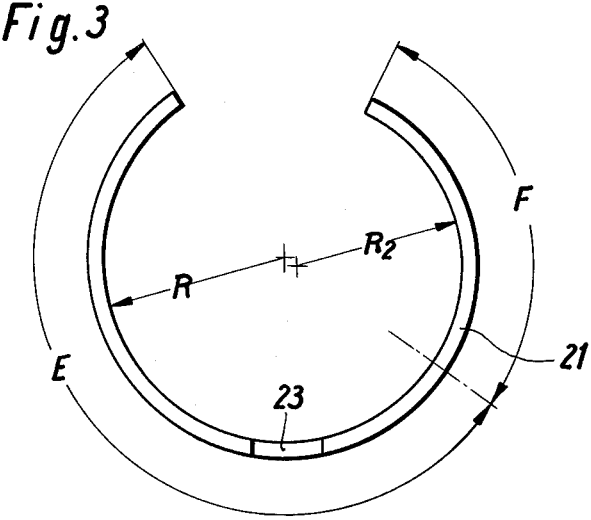
FIG. 3 is a side view of one embodiment of a blocking means in accordance with the present invention.
Figure 4:
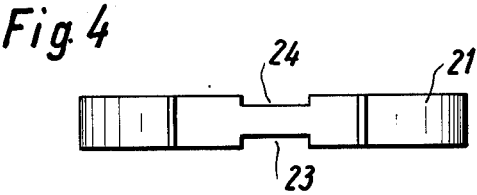
FIG. 4 is a plan view on the blocking means of FIG. 3.
Figure 5:
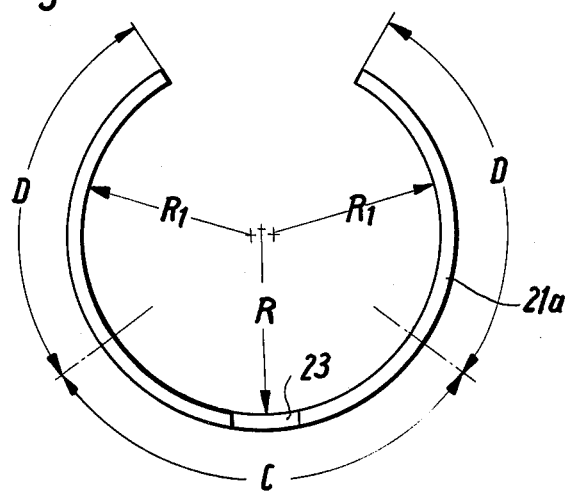
FIG. 5 is a side view of a further embodiment of a blocking means in accordance with the present invention.

Particularly appropriately shaped blocking means are illustrated in FIGS. 3 and 5. The blocking means 21 of FIG. 3 is provided within the area E with a concentrically extending radius R and within the area F with a radius $R_2$ extending eccentrically to the area E. The blocking means 21a of FIG. 5 is provided within the area C with a concentrically extending radius R and within the areas D with a radius $R_1$ extending eccentrically to the area C. A further embodiment of an abutment is illustrated in FIG. 6. This abutment 27a is provided with a curved surface 34 in lieu of the inclined surface 32.

The transmission section illustrated in FIGS. 7 and 8 corresponds essentially to the transmission section illustrated in FIGS. 1 and 2. Only the configuration of the blocking means 35 and of the abutment 36 is changed in this synchronizing mechanism which is used for the remaining speeds. The blocking means 35 which has a concentrically extending radius R (FIG. 9), actuates during synchronizing operations the abutment 36 which in the direction of rotation A is supported with the curved surface 37 at the perpendicular surface 30 and in the direction of rotation B with the curved surface 38 at the perpendicular surface 33 so that the blocking action is equally large in both directions of rotation. The shifting operation takes place in the same manner as already described in connection with FIGS. 1 and 2.

A further embodiment of an abutment is illustrated in FIG. 10. This abutment 36a is provided, in lieu of the curved surfaces 37 and 38, with straight surfaces 39 and 40 extending at an inclination to the perpendicular surfaces 30 and 33.

The synchronization mechanism illustrated in FIGS. 7 and 8 is not limited to the use of the blocking means 35. Thus, for example, the use of the blocking means 21a (FIG. 5) is also quite feasible in connection with this synchronization mechanism.

The blocking means 41 of FIG. 11 is provided with a recess or aperture 42 of any suitable shape which is preferably contructed as round aperture. A pin 43 of the abutment 44 of FIG. 12 projects into this aperture 42, whereby the abutment 44 is anchored together with the blocking means 41. The pin 43 is preferably matched in its shape to the aperture 42. The pin 43 and the webs 25 and 26 (FIG. 1) are limited in their height in such a manner that they do not come into contact with the inner surface of the synchronizing ring during a synchronizing operation. The application of a pin at an abutment is not limited to abutments of the type illustrated in FIG. 12 but is feasible also in connection with all other illustrated abutments. Therebeyond, the anchoring of the abutment is not limited to the illustrated embodiments. Thus, it is possible, for example, to anchor the abutment only in one groove arranged at one of the end faces of the blocking means.

While I have shown and described several embodiments in accordance with the present invention, it is thus understood that it is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an independent abutment means extending in a recess means provided in the hub of the coupling means, the abutment means being engaged in a groove in the hub of the coupling means and being effectively anchored together with the blocking means between the ring ends thereof and the abutment means being loosely guiding in the blocking means such that a minor relative movement of said blocking means with respect to said abutment means takes place during synchronizing operations.

2. A synchronizing mechanism according to claim 1, characterized in that the abutment means is supported in one circumferential direction with a substantially perpendicular surface at a substantially perpendicular side surface of the recess means and in the opposite circumferential direction with a deflection surface means at a substantially perpendicular side surface of the recess means.

3. A synchronization mechanism according to claim 2, characterized in that the deflection surface means is formed by a curved surface.

4. A synchronization mechanism according to claim 2, characterized in that the deflection surface means is formed by a flat surface extending at an inclination to the perpendicular side surface of the recess means.

5. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends thereof, and characterized in that the blocking means has within a first area a substantially concentrically extending radius and within a second area a radius extending eccentrically to the first area.

6. A synchronization mechanism according to claim 5, characterized in that the first area is adjacent to the second area and is at least as large as the second area.

7. A synchronization mechanism according to claim 6, characterized in that the first area extends from one end over more than half of the circumferential extent of the blocking means while the second area is adjacent to the first area.

8. A synchronization mechanism according to claim 6, characterized in that the first area is disposed between adjacent second areas of the blocking means.

9. A synchronization mechanism according to claim 8, characterized in that the second areas extend from a respective end of the blocking means to the first area.

10. A synchronization mechanism according to claim 1, characterized in that the abutment means is supported in both circumferential directions with a deflection surface means at a substantially perpendicular surface of the recess means.

11. A synchronization mechanism according to claim 10, characterized in that the deflection surface means is formed by a curved surface.

12. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends thereof, characterized in that the abutment means is supported in both circumferential directions with a deflection surface means at a substantially perpendicular surface of the recess means, and characterized in that the deflection means is formed by a flat surface extending at an inclination to the substantially perpendicular side surface of the recess means.

13. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends thereof, and characterized in that the blocking means has an eccentrically extending radius.

14. A synchronization mechanism according to claim 1, characterized in that the blocking means is provided within the area of the abutment means at the end faces thereof with oppositely disposed radial grooves, the abutment means being provided at the side opposite the recess means with a groove means extending in the circumferential direction, and the webs of the abutment means delimiting the groove means extending into the grooves of the blocking means.

15. A synchronization mechanism according to claim 1, characterized in that the abutment means is provided with a pin on the side opposite the recess means, which engages into an aperture means arranged between the end surfaces of the blocking means.

16. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends thereof, characterized in that one of the abutment means is supported in one circumferential direction with a substantially perpendicular surface at a substantially perpendicular side surface of the recess means and in the opposite circumferential direction with a deflection surface means at a substantially perpendicular side surface of the recess means, and characterized in that the blocking means is provided within the area of the abutment means at the end faces thereof with oppositely disposed radial grooves, the abutment means being provided at the side opposite the recess means with a groove means extending in the circumferential direction, and the webs of the abutment means delimiting the groove means extending into the grooves of the blocking means.

17. A synchronization mechanism, especially for change-speed transmissions of motor vehicles, in which each slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at a respective abutment means extending in a recess means provided in the hub of the associated coupling means, the abutment means being effectively anchored together with the corresponding blocking means between the right ends thereof, characterized in that one of the abutment means is supported in one circumferential direction with a substantially perpendicular surface at a substantially perpendicular side surface of the recess means and in the opposite circumferential direction with a deflection surface means at a substantially perpendicular side surface of the recess means, characterized in that another one of the abutment means is supported in both circumferential directions with a deflection surface means at a substantially perpendicular surface of the recess means, and characterized in that the last mentioned deflection means is formed by a flat surface extending at an inclination to the substantially perpendicular side surface of the recess means.

18. A synchronization mechanism according to claim 16, characterized in that at least one of the deflection surface means is formed by a curved surface.

19. A synchronization mechanism, especially for change-speed transmissions of motor vehicles, in which each slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at a respective abutment means extending in a recess means provided in the hub of the associated coupling means, the abutment means being effectively anchored together with the corresponding blocking means between the ring ends thereof, characterized in that one of the abutment means is supported in one circumferential direction with a substantially perpendicular surface at a substantially perpendicular side surface of the recess means and in the opposite circumferential direction with a deflection surface means at a substantially perpendicular side surface of the recess means, characterized in that another one of the abutment means is supported in both circumferential directions with a deflection surface means at a substantially perpendicular surface of the recess means, and characterized in that at least one of the deflection surface means is formed by a flat surface extending at an inclination to the perpendicular side surface of the recess means.

20. A synchronization mechanism, especially for change-speed transmissions of motor vehicles, in which each slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at a respective abutment means extending in a recess means provided in the hub of the associated coupling means, the abutment means being effectively anchored together with the corresponding blocking means between the ring ends thereof, characterized in that one of the abutment means is supported in one circumferential direction with a substantially perpendicular surface at a substantially perpendicular side surface of the recess means and in the opposite circumferential direction with a deflection surface means at a substantially perpendicular side surface of the recess means, characterized in that another one of the abutment means is supported in both circumferential directions with a deflection surface means at a substantially perpendicular surface of the recess means, and characterized in that at least one of the blocking means has within a first area a substantially concentrically extending radius and within a second area a radius extending eccentrically to the first area.

21. A synchronization mechanism according to claim 20, characterized in that the first area is adjacent to the second area and is at least as large as the second area.

22. A synchronization mechanism according to claim 21, characterized in that the first area extends from one end over more than half of the circumferential extent of the blocking means while the second area is adjacent to the first area.

23. A synchronization mechanism according to claim 21, characterized in that the first area is disposed between adjacent second areas of the blocking means.

24. A synchronization mechanism according to claim 23, characterized in that the second areas extend from a respective end of the blocking means to the first area.

25. A synchronization mechanism according to claim 18, characterized in that at least one of the abutment means is provided with a pin on the side opposite the recess means, which engages into an aperture means arranged between the end surfaces of the blocking means.

26. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends thereof, characterized in that the abutment means is supported in one circumferential direction with a substantially perpendicular surface at a substantially perpendicular side surface of the recess means and in the opposite circumferential direction with a deflection surface means at a substantially perpendicular side surface of the recess means, and characterized in that the deflection surface means is formed by a flat surface extending at an inclination to the perpendicular side surface of the recess means.

27. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends thereof, and characterized in that the blocking means is provided within the area of the abutment means at the end faces thereof with oppositely disposed radial grooves, the abutment means being provided at the side opposite the recess means with a groove means extending in the circumferential direction, and the webs of the abutment means delimiting the groove means extending into the grooves of the blocking means.

28. A synchronization mechanism, especially for change-speed transmissions of motor vehicles, in which a slotted synchronizing ring means is under the influence of slotted, substantially ring-shaped blocking means increasing the servo-effect thereof, the blocking means being arranged between the synchronizing ring means and a hub of an associated coupling means, characterized in that the blocking means is supported during a synchronizing operation at an abutment means extending in a recess means provided in the hub of the coupling means, the abutment means being effectively anchored together with the blocking means between the ring ends, thereof, and characterized in that the abutment means is provided with a pin on the side opposite the recess means, which engages into an aperture means arranged between the end surfaces of the blocking means.

* * * * *